United States Patent
Kroes et al.

(10) Patent No.: US 11,569,760 B2
(45) Date of Patent: Jan. 31, 2023

(54) POWER GENERATION OR CONVERSION SYSTEM

(71) Applicant: KONINKLIJKE PHILIPS N.V., Eindhoven (NL)

(72) Inventors: Hans Kroes, Olst (NL); Lutz Christian Gerhardt, Eindhoven (NL); Mark Thomas Johnson, Arendonk (BE)

(73) Assignee: Koninklijke Philips N.V., Eindhoven (NL)

( * ) Notice: Subject to any disclaimer, the term of this patent is extended or adjusted under 35 U.S.C. 154(b) by 1256 days.

(21) Appl. No.: 16/065,340

(22) PCT Filed: Dec. 15, 2016

(86) PCT No.: PCT/EP2016/081092
§ 371 (c)(1),
(2) Date: Jun. 22, 2018

(87) PCT Pub. No.: WO2017/108546
PCT Pub. Date: Jun. 29, 2017

(65) Prior Publication Data
US 2021/0211070 A1    Jul. 8, 2021

(30) Foreign Application Priority Data
Dec. 24, 2015 (EP) ..................................... 15202735

(51) Int. Cl.
*H02N 1/04* (2006.01)
*H02N 2/18* (2006.01)

(52) U.S. Cl.
CPC ................. *H02N 1/04* (2013.01); *H02N 2/18* (2013.01)

(58) Field of Classification Search
CPC .. H02N 1/04; H02N 2/18; H02N 1/08; H02N 2/186
See application file for complete search history.

(56) References Cited

U.S. PATENT DOCUMENTS

| 4,595,852 A | 6/1986 | Gundlach |
| 2014/0292138 A1 | 10/2014 | Wang et al. |

(Continued)

FOREIGN PATENT DOCUMENTS

| CN | 103780137 A | 7/2014 |
| CN | 104660093 A | 5/2015 |

(Continued)

OTHER PUBLICATIONS

JP2004082288A—English Translation (Year: 2021).*

(Continued)

*Primary Examiner* — Tulsidas C Patel
*Assistant Examiner* — Viswanathan Subramanian

(57) ABSTRACT

A triboelectric energy generator (1) comprises a first generating element (8) and a second generating element (10). The first generating element comprises a first triboelectric material (9) and the second generating element comprises a second triboelectric material (13). Movement of the second generation element relative to the first generation element results in an output voltage, as a consequence of the triboelectric effect. A stopper (7) is configured to restrict rotation of the second generating element, so that the second generating element may only rotate through a desired angle.

20 Claims, 8 Drawing Sheets

(56) References Cited

U.S. PATENT DOCUMENTS

| | | | | |
|---|---|---|---|---|
| 2014/0338458 A1* | 11/2014 | Wang | ................ | H02N 1/04 310/309 |
| 2015/0001993 A1 | 1/2015 | Park et al. | | |

FOREIGN PATENT DOCUMENTS

| | | | | |
|---|---|---|---|---|
| CN | 204517699 | | | 7/2015 |
| CN | 105048860 | A | * | 11/2015 |
| JP | 08140369 | A | * | 5/1996 |
| JP | 8140369 | A | | 5/1996 |
| JP | 2004082288 | A | | 3/2004 |
| JP | 2015146727 | A1 | | 8/2015 |
| WO | 2014154092 | A1 | | 2/2014 |

OTHER PUBLICATIONS

JPH08140369A—English Translation (Year: 2021).*
CN5048860Englishtranslation (Year: 2022).*
Bai et al: "Integrated Multilayered Triboelectric Nanogenerator for Harvesting Biomechanical Energy From Human Motions"; ACS Nano, 2013, vol. 7, No. 4, pp. 3713-3719.
Diaz et al: "A Semi-Quantitative Tribo-Electric Series for Ploymeric Materials: The Influence of Chemical Structure and Properties"; Journal of Electrostatics, 62, (2004), pp. 277-290.
Jing et al: "Case-Encapsulated Triboelectric Nanogenerator for Harvesting Energy From Reciprocating Sliding Motion"; ACS Nano, 2014, pp. 1-7.
Lee et al: "Triboelectric Nanogenerator for Harvesting Pendulum Oscillation Energy"; Nano Energy, 2013, vol. 2, pp. 1113-1120.
Lin et al: "Segmentally Structured Disk Triboelectric Nanogenerator for Harvesting Rotational Mechanical Energy"; Nano Letters, ACS Publications, 2013, pp. 2916-2923.
Lin et al: "Noncontact Free=Rotating Disk Triboelectric Nanogenerator as a Sustainable Energy Harvester and Self-Powered Mechanical Sensor"; ACS Applied Materials & Interfaces,2014, pp. 3031-3038.
Wang et al: "Triboelectric Nanogenerators as Self-Powered Active Sensors"; Nano Energy (2015), vol. 11, pp. 436-462.
Wang et al: "Triboelectric Nanogenerators as New Energy Technology for Self-Powered Systems and as Active Mechanical and Chemical Sensors";ACS Nano, 2013, pp. 1-25.
Wang et al: "Freestanding Triboelectric-Layer-Based Nanogenerators for Harvesting Energy From a Moving Object or Human Motion in Contact and Non-Contact Modes"; Advanced Materials, 2014, vol. 26, pp. 2818-2824.
Wang et al: "Progress in Triboelectric Nanogenerators as a New Energy Technology and Self-Powered Sensors"; Royal Society of Chemistry, 2015, pp. 1-33.
Wu et al: "A Self-Powered Angle Measurement Sensor Based on Triboelectric Nanogenerator"; Adv. Funct. Mater. 2015, pp. 1-9.
Yang et al: "Single-Electrode-Based Sliding Triboelectric Nanogenerator for Self-Powered Displacement Vector Sensor System"; ACS Nano, vol. 7, No. 8, 2013, pp. 7342-7351.
Zhu et al: "Radial-Arrayed Rotary Electrification for High Performance Triboelectric Generator"; Nature Communications, 2014 pp. 1-9.
Zhu et al:"Triboelectric Nanogenerators as a New Energy Technology: From Fundamentals, Devices, to Applications"; Nano Energy, 2014, pp. 1-13.

* cited by examiner

POWER GENERATION OR CONVERSION SYSTEM

CROSS-REFERENCE TO PRIOR APPLICATIONS

This application is the U.S. National Phase application under 35 U.S.C. § 371 of International Application No. PCT/EP2016/081092, filed on Dec. 15, 2016, which claims the benefit of European Patent Application No. 15202735.5, filed on Dec. 24, 2015. These applications are hereby incorporated by reference herein.

FIELD OF THE INVENTION

The invention relates to an energy conversion system for converting mechanical energy into electrical energy, and methods of energy conversion.

BACKGROUND OF THE INVENTION

One example of such a system, whereby mechanical energy may be converted into electrical energy, is a triboelectric energy generation system. The triboelectric effect (also known as triboelectric charging) is a contact-induced electrification in which a material becomes electrically charged after it is contacted with a different material through friction. Triboelectric generation is based on converting mechanical energy into electrical energy through methods which couple the triboelectric effect with electrostatic induction. It has been proposed to make use of triboelectric generation to power wearable devices such as sensors and smartphones by capturing the otherwise wasted mechanical energy from such sources as walking, random body motions, the wind blowing, vibration or ocean waves (see, for example: Wang, Sihong, Long Lin, and Zhong Lin Wang. "Triboelectric nanogenerators as self-powered active sensors" Nano Energy 11 (2015): 436-462).

The triboelectric effect is based on a series that ranks various materials according to their tendency to gain electrons (become negatively charged) or lose electrons (become positively charged). This series is for example disclosed in A. F. Diaz and R. M. Felix-Navarro, a semi-quantitative tribo-electric series for polymeric materials: the influence of chemical structure and properties, Journal of Electrostatics 62 (2004) 277-290. The best combinations of materials to create static electricity are one from the positive charge list and one from the negative charge list (e.g. PTFE against copper, or FEP against aluminum). Rubbing glass with fur, or a comb through the hair are well-known examples from everyday life of triboelectricity.

In its simplest form, a triboelectric generator thus uses two sheets of dissimilar materials, one an electron donor, the other an electron acceptor. One or more of the materials can be an insulator. Other possible materials might include semiconductor materials, for example silicon comprising a native oxide layer. When the materials are brought into contact, electrons are exchanged from one material to the other. This is simply the triboelectric effect. If the sheets are then separated, each sheet holds an electrical charge (of differing polarity), isolated by the gap between them, and an electric potential is built up. If an electrical load is connected between electrodes placed at the backside of the two material surfaces, any further displacement of the sheets, either laterally or perpendicularly, will induce in response a current flow between the two electrodes. This is simply an example of electrostatic induction. As the distance between the respective charge centers of the two plates is increased, so the attractive electric field between the two, across the gap, weakens, resulting in an increased potential difference between the two outer electrodes, as electrical attraction of charge via the load begins to overcome the electrostatic attractive force across the gap.

In this way, triboelectric generators convert mechanical energy into electrical energy through a coupling between two main physical mechanisms: contact electrification (tribo-charging) and electrostatic induction.

By cyclically increasing and decreasing the mutual separation between the charge centers of the plates, so current can be induced to flow back and forth between the plates in response, thereby generating an alternating current across the load. The power output can be increased by applying micron-scale patterns to the polymer sheets. The patterning effectively increases the contact area and thereby increases the effectiveness of the charge transfer.

Recently, an emerging material technology for power generation (energy harvesting) and power conversion has been developed which makes use of this effect, as disclosed in Wang, Z. L. "Triboelectric nanogenerators as new energy technology for self-powered systems and as active mechanical and chemical sensors." *ACS nano* 7.11 (2013): 9533-9557. Based on this effect several device configurations have been developed of so-called triboelectric nanogenerators ("TENG") or triboelectric generators ("TEG").

Since their first reporting in 2012, the output power density of TEGs has been greatly improved. The volume power density may reach more than 400 kilowatts per cubic meter, and an efficiency of ~60% has been demonstrated (ibid.). In addition to high output performance, TEG technology carries numerous other advantages, such as low production cost, high reliability and robustness, and low environmental impact.

The TEG may be used as an electrical power generator, i.e. energy harvesting from, for example, vibration, wind, water, random body motions or even conversion of mechanically available power into electricity. The generated voltage is a power signal.

TEGs may broadly be divided into four main operational classes.

A first mode of operation is a vertical contact-separation mode, in which two or more plates are cyclically brought into or out of contact by an applied force. This may be used in shoes, for example, where the pressure exerted by a user as they step is utilized to bring the plates into contact. One example of such a device has been described in the article "Integrated Multilayered Triboelectric Nanogenerator for Harvesting Biomechanical Energy from Human Motions" of Peng Bai et. al. in ACS Nano 2013 7(4), pp. 3713-3719. Here, the device comprises a multiple layer structure formed on a zigzag shaped substrate. The device operates based on surface charge transfer due to contact electrification. When a pressure is applied to the structure, the zigzag shape is compressed to create contact between the different layers, and the contact is released when the pressure is released. The energy harvested might be for example used for charging of mobile portable devices.

A second mode of operation is a linear sliding mode, wherein plates are induced to slide laterally with respect to one another in order to change the area of overlap between them. A potential difference is induced across the plates, having an instantaneous magnitude in proportion to the rate of change of the total overlapping area. By repeatedly bringing plates into and out of mutual overlap with one another, an alternating current may be established across a load connected between the plates.

A design which enables energy to be harvested from sliding motions is disclosed in the article "Freestanding Triboelectric-Layer-Based Nanogenerators for Harvesting Energy from a Moving Object of Human Motion in Contact and Non-Contact Modes" in Adv. Mater. 2014, 26, 2818-2824. A freestanding movable layer slides between a pair of static electrodes. The movable layer may be arranged not to make contact with the static electrodes (i.e. at small spacing above the static electrodes) or it may make sliding contact.

A third mode of operation is a single electrode mode in which one surface is for example grounded—for example, a floor road—and a load is connected between this first surface and ground (see for example Yang, Ya, et al. "Single-electrode-based sliding triboelectric nanogenerator for self-powered displacement vector sensor system.", *ACS nano* 7.8 (2013): 7342-7351). The second surface—not electrically connected to the first—is brought into contact with the first surface and tribocharges it. As the second surface is then moved away from the first, the excess charge in the first surface is driven to ground, providing a current across the load. Hence only a single electrode (on a single layer) is used in this mode of operation to provide an output current.

A fourth mode of operation is a freestanding triboelectric layer mode, which is designed for harvesting energy from an arbitrary moving object to which no electrical connections are made. This object may be a passing car, passing train, or a shoe, for example. (Again, see "Triboelectric nanogenerators as new energy technology for self-powered systems and as active mechanical and chemical sensors." *ACS nano* 7.11 (2013): 9533-9557).

There are still further designs of triboelectric generator, such as a double-arch shaped configuration based on contact electrification. A pressure causes the arches to close to make contact between the arch layers, and the arches returns to the open shape when the pressure is released. A triboelectric generator has also been proposed which is formed as a harmonic resonator for capturing energy from ambient vibrations.

One particular subset of linear sliding mode TEGs which have been developed are rotational disk TEGs which can be operated in both a contact (i.e., continuous tribocharging and electrostatic induction) or a non-contact mode (i.e., only electrostatic induction after initial contact electrification). Rotational disk TEGs typically consist of at least one rotor and one stator each formed as a set of spaced circle sectors (segments). The sectors overlap and then separate as the two disks rotate relative to each other. As described above, a current may be induced between two laterally sliding—oppositely charged—layers, with a magnitude in proportion to the rate of change of the area of overlap. As each consecutively spaced sector of the rotor comes into and then out of overlap with a given stator sector, so a current is induced between the two sector plates, initially in a first direction, as the plates increase in overlap, and then in the opposite direction as the plates decrease in overlap.

The limitations of early versions of segmentally structured disk TEGs (Long Lin et al., Segmentally Structured Disk Triboelectric Nanogenerator for Harvesting Rotational Mechanical Energy, Nano Lett., 2013, 13 (6), pp. 2916-2923) were that the rotational and stationary triboelectric layers require deposition of metal electrodes and connection with electrical leads, leading to inconvenient operation of the rotational part.

A disk TEG with both groups of patterned electrodes attached onto a stationary disk, together with a freestanding triboelectric layer on a rotational disk can resolve these issues, as disclosed in Long Lin et al., Noncontact Free-Rotating Disk Triboelectric Nanogenerator as a Sustainable Energy Harvester and Self-Powered Mechanical Sensor. ACS Appl. Mater. Interfaces, 2014, 6 (4), pp. 3031-3038.

With such a structure, there is no necessity for electrode deposition or electrical connection for the rotational part, which dramatically improves the operating facility of the energy harvester.

Rotational disk TEGs, and indeed linear sliding mode TEGs in general, can be operated in both a contact mode and a non-contact mode. Although contact is desired to tribo-charge the plates (both initially and also subsequently, to counteract leakage) the electrostatic induction process itself (by means of which the electrical energy is generated) does not require contact between the plates, but operates well with a small plate separation (of, for example, approximately 0.5 mm).

Operating in a contact mode—wherein the plates are maintained in continual contact such that there is friction between them—results in a higher power output, since the plates are being continually charged, and hence continually maintained at some theoretical maximal charge capacity (defined by the capacitance of the bi-plate system) by continual replacement of charge lost through leakage etc. The greater the charge which can be maintained on the plates, the greater the electrostatic inductive output which can be generated, since naturally a greater charge density induces a greater electrostatic force between electrons in the plates.

Conventional rotating TEG's rely on continuous, usually high speed, full 360 degree rotation of the rotor element near the stator element. These devices perform poorly when only a small oscillating rotational movement is applied; it is therefore difficult to harvest energy from this type of mechanical movement. There is therefore a need for a TEG device that produces optimized power output from small angular oscillations.

SUMMARY OF THE INVENTION

The invention is defined by the claims.

According to examples in accordance with an aspect of the invention, there is provided a triboelectric energy generator adapted to generate electrical energy from rotational oscillatory motion, comprising:

a first generating element comprising a first triboelectric material;

a second generating element comprising a second triboelectric material, wherein the second generating element is arranged to oscillate about a rotation axis with respect to the first generating element to generate an output voltage, and a stopper arranged to limit rotation of the second generating element with respect to the first generating element, and a stator comprising the first generating element; and a rotor comprising the second generating element, wherein the rotor and the stator are co-axial and the rotor is arranged to rotate about a co-axis and the stopper is arranged to limit rotation of the rotor about the co-axis.

The triboelectric energy generator comprises a first generating element and a second generating element, which are arranged such that relative movement between the first and second generating elements produces an output voltage. The relative movement may result in a change in the separation between the first and second triboelectric materials, or a change in the area of overlap between the first and second triboelectric materials.

In use, the triboelectric energy generator can be used to power an external circuit by connecting the first and second generating elements to the external circuit. The first and second triboelectric materials are dissimilar triboelectric materials (one is an electron donor, while the other is an electron acceptor). Contact between the first and second triboelectric materials causes a build-up of charge in the first and second generating elements, so that the first and second generating elements become oppositely charged. Movement of the second generating element relative to the first generating element results in an output voltage as a consequence of a combination of the triboelectric effect and electrostatic induction.

In use, the second generating element rotates while the first generating element is stationary. The second generating element rotates from an initial position through an angle relative to the first generating element and then rotates back to the initial position. In this way, the second generating element performs a rotational oscillation, and moves between a first configuration and a second configuration. The stopper is configured to restrict rotation of the second generating element, so that the second generating element may only rotate through a desired angular range, up to a maximum angle of rotation.

When the triboelectric energy generator is connected to an external circuit, rotation of the rotor relative to the stator gives rise to an alternating flow of electrons. The stopper restricts rotation of the rotor about the co-axis to a desired angular range.

Further, by restricting rotational movement to a specific angular range, the stopper provides an energy generating rotational damper which can remove unwanted frequencies, for example rattling noises. The stopper is arranged to limit the rotation of the rotor to a maximum level of angular displacement. The maximum angle is the largest allowed angle of rotation of the rotor relative to the stator.

Note that the rotation axis may be static or it may move, for example to allow a rolling motion. The rotation axis may move in small linear axial movements; this may be particularly useful for operating in a non-contact mode (in which the first and second triboelectric materials do not contact each other) or for periodic recharging.

The energy generator receives mechanical energy from an input source. The input source of energy moves in an oscillating manner, for example it vibrates. Conventional rotating triboelectric generators are inefficient at converting oscillating movements into electrical energy.

In some embodiments, by restricting the movement of the second generating element, efficient power generation from small motions is enabled, since the contact duration or duration over which the first and second triboelectric materials overlap is maximized.

In some embodiments, the stopper provides an increased contact or overlap area for improved tribocharging and power generation.

The triboelectric energy generator is particularly effective at converting small periodic rotational movements into electricity. For example, the generator is optimized for angular movements of less than 360 degrees, rather than for continuous, repeated full 360 degree rotations. The triboelectric energy generator can therefore be used to generate electricity from an input source that oscillates with a small amplitude. In examples, the generator is optimized for use with angular movements of less than or equal to 60 degrees or less than or equal to 15 degrees.

The triboelectric energy generator may further comprise: a stator comprising the first generating element; and a rotor comprising the second generating element, wherein the rotor and the stator are co-axial and the rotor is arranged to rotate about a co-axis and the stopper is arranged to limit rotation of the rotor about the co-axis.

When the triboelectric energy generator is connected to an external circuit, rotation of the rotor relative to the stator gives rise to an alternating flow of electrons. The stopper restricts rotation of the rotor about the co-axis to a desired angular range.

Further, by restricting rotational movement to a specific angular range, the stopper provides an energy generating rotational damper which can remove unwanted frequencies, for example rattling noises. The stopper is arranged to limit the rotation of the rotor to a maximum level of angular displacement. The maximum angle is the largest allowed angle of rotation of the rotor relative to the stator.

The rotor may comprise one or a plurality of fins that project outwardly from the co-axis, and the stopper may be arranged to restrict movement of the fins. The fins may project radially from a center point of the rotor. By limiting movement of the fins, the rotor is prevented from rotating about the axis outside of a desired angular range.

At least one fin may comprise the second generating element, and the stator may comprise the first generating element arranged to interface with the second generating element in use. One or each of the fins may implement a second generating element. Each fin may comprise a portion, provided with the second triboelectric material, which is arranged to overlap with an area of the stator comprising the first triboelectric material in use. In examples comprising a plurality of fins, the fins may be provided with both the first and second triboelectric materials, and the stator may also be provided both the first and second triboelectric materials. For example, a fin may be provided with the first triboelectric material and the next adjacent fin may be provided with the second triboelectric material so that the fins are provided with the first and second triboelectric material alternately. The stator may be provided with the first and second triboelectric material alternately, in an arrangement that corresponds with the arrangement of the first and second triboelectric material on the fins.

The stopper may be configured to restrict the rotor to rotate within an angular range of from 0 degrees to 360 degrees, 0 to 180 degrees, 0 to 120 degrees, 0 to 90 degrees, 0 to 60 degrees, 0 to 45 degrees, 0 to 30 degrees, 0 to 15 degrees, 0 to 10 degrees, 0 to 5 degrees, or 0 to 1 degrees. The stopper may comprise a plurality of stopper portions which are arranged to restrict movement of the rotor. A plurality of stopper portions may define an angle through which a fin of the rotor can freely rotate. The stopper portions may be arranged radially in order to restrict movement of the rotor to an angular range defined by the position of the stopper portions.

The stopper may be implemented by the stator. For example, the stopper may be provided by protrusions or by a wall.

A surface of the stopper, arranged to contact the second generating element in use, may be provided with the first triboelectric material. The rotor may be rotated towards the stopper until the second generating element and the stopper contact each other. At this point, when the triboelectric energy generator is connected to an external circuit, the impact between the first and second triboelectric materials produces an electrical signal. As the rotor moves away from the stopper, the separation between the first and second triboelectric materials increases, producing another electrical signal of opposite polarity to the initial electrical signal.

The rotor may comprise a first locking member, and the stopper may be shaped to receive the first locking member.

The first locking member may comprise the second generating element. The stopper may comprise the first generating element. The locking member may comprise a plurality of projections which are shaped to complement the shape of the stopper. In this way, an effective maximum overlap area between the first and second generating members may be increased. Thus, power generation efficiency may be optimized.

The first generating element may comprise a first electrode attached to the first triboelectric material and the second generating element may comprise a second electrode attached to the second triboelectric material.

When the first triboelectric material and the second triboelectric material contact each other, each material builds up a charge of opposite polarity to the other material. Relative movement between the first and second triboelectric material causes electrostatic induction in a corresponding electrode.

According to another aspect of the invention, there is provided a triboelectric energy generator comprising:
 a first generating element; and
 a second generating element, having a central axis, comprising:
  a first portion on a first side of the central axis; and
  a second portion on a second side of the central axis opposite to the first side, wherein the second generating element is arranged to oscillate about the central axis from a first position, at which the first portion contacts the first generating element, to a second position at which the second portion contacts the first generating element.

The first and second generating elements comprise triboelectric materials. The second portion may be arranged to perform a rocking motion, so that when the first portion contacts the first generating element the second portion is separated from the first generating element and vice versa. When the first portion contacts the first generating element, the first and second triboelectric materials become tribocharged. At the same time, as the first portion moves towards the first generating element, the second portion moves away from it, so that a potential difference is built up between the second portion and the first generating element. In the same way, when the second portion contacts the first generating element a charge is built up (the second portion is tribocharged). As the second portion moves towards the first generating element, the first portion moves away from it, so that a potential difference is built up between the first portion and the first generating element.

The first portion and the second portion may comprise a charging surface arranged to contact the first triboelectric material in use.

The second generating element may be adapted such that in use the angle subtended by the charging surface of the portion in contact with the first triboelectric material is equal to or less than 180 degrees, or preferably less than or equal to 90 degrees.

The first portion may comprise a first charging surface arranged to face a surface of the first generating element, and in use the angle subtended by the first charging surface and the opposing surface of the first generating element may be less than or equal to 180 degrees, or preferably less than or equal to 90 degrees.

The second portion may comprise a second charging surface arranged to face a surface of the first generating element, and wherein in use the angle subtended by the first charging surface and the opposing surface of the first generating element may be equal to or less than 180 degrees, or preferably less than or equal to 90 degrees.

The second generating element may be configured to rotate about a central axis. For example, the second generating element may rotate about an axis perpendicular to the first generating element. Therefore, the triboelectric energy generator may perform a rolling motion as well as a rocking motion. In this way, product life time may be extended since different parts of the first and second triboelectric materials contact each other depending on the roll of the second generating element.

The first generating element may comprise a first electrode and the second generating element may comprise a second electrode.

The first generating element may comprise a first electrode and a second electrode.

The triboelectric energy generator may further comprise a stopper, wherein the second generating element contacts the stopper in the first position and the second position.

The angle of rotation of the second generating element in the first and second position is less than 45 degrees.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a triboelectric energy generator comprising a first generating element and a second generating element. The first generating element comprises a first triboelectric material and the second generating element comprises a second triboelectric material, which is different to the first triboelectric material. Movement of the second generation element relative to the first generation element results in an output voltage and an output current, as a consequence of a combination of the triboelectric effect and electrostatic induction. Therefore, oscillation of the second generating element in response to mechanical disturbance in the environment can be used to generate of electricity. The triboelectric energy generator includes a stopper which is configured to restrict rotation of the second generating element, so that the second generating element may only rotate through a specific angle determined by the position of the stopper. The triboelectric energy generator is adapted to maximize and/or optimize energy generation from small periodic rotational movements.

Figure 1:
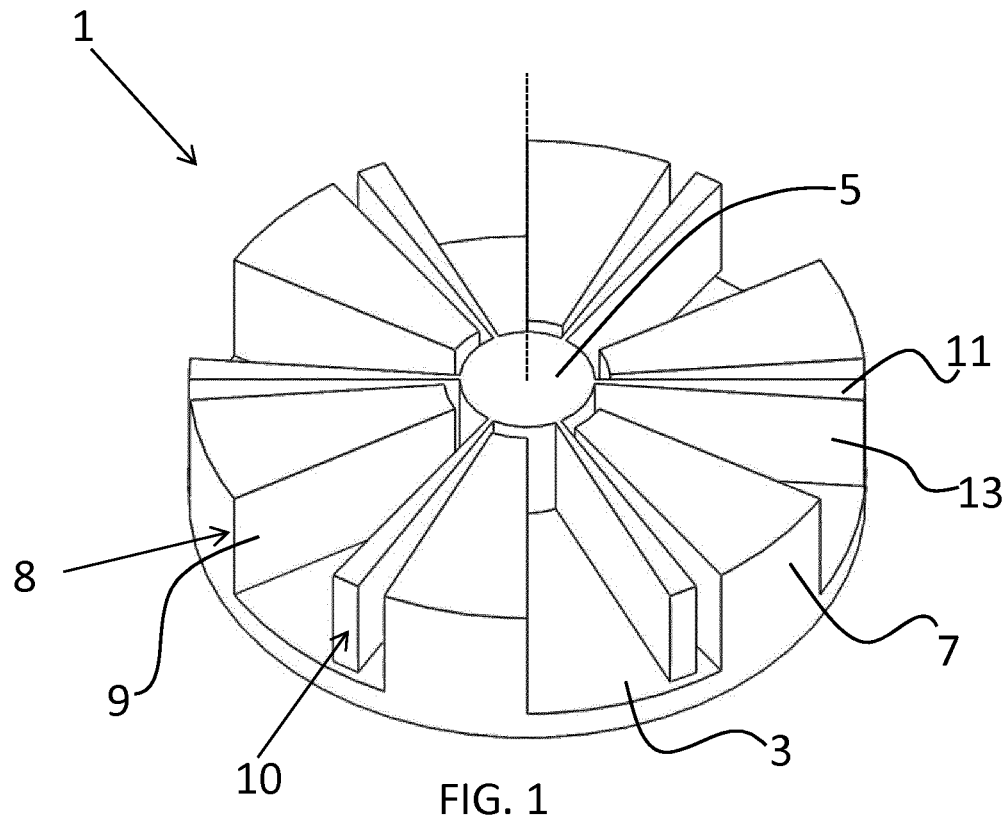
FIG. 1 shows a triboelectric energy generator according to a first example.

FIG. 1 shows an example of a triboelectric energy generator 1, comprising a stator 3 and a rotor 5. The rotor 5 is positioned inside a cavity of the stator 3 in a co-axial arrangement, and the rotor 5 is arranged to rotate about the co-axis (shown by the dashed line). The stator 3 comprises a plurality of protrusions which extend from the periphery of the stator 3 towards the center of the stator. As well as implementing a stopper 7, the protrusions implement a first generating element 8 since the lateral surfaces of the protrusions, which are perpendicular to the base of the stator, are covered with the first triboelectric material 9. The second generating element 10 is provided by the rotor 5 which comprises a plurality of fins 11. The fins 11 diverge outwardly from the center of the rotor 5 and are positioned to extend between consecutive stator protrusions. In this way, the rotor 5 and stator 3 are arranged such that the rotor can only rotate by a desired angle before hitting a part of the stopper 7. The lateral surfaces of each fin 11 are covered with the second triboelectric material 13. In use, the fins 11 oscillate between the protrusions which implement the first generating element 8 on either side of the fin 11. When the fins 11 fit the stopper 7, the first triboelectric material 9 and the second triboelectric material 13 contact each other and generate an electrical signal.

Both the rotor and stator may have electrode arrangements positioned below or behind the triboelectric material. The stator 3 may comprise a first electrode positioned below or behind the first triboelectric material 9 and the rotor 5 comprises a second electrode positioned below or behind the second triboelectric material 13.

Alternatively, the stator may comprise a series of disposed (conductive) electrodes, while the rotor comprises a freestanding layer of dielectric material, which may be metallic or non-metallic. In addition (as discussed in Long Lin et al., Noncontact Free-Rotating disc Triboelectric Nanogenerator as a Sustainable Energy Harvester and Self-Powered Mechanical Sensor. ACS Appl. Mater. Interfaces, 2014, 6 (4), pp. 3031-3038), with such a structure, there is no necessity for electrode deposition or electrical connection for the rotational part, which dramatically improves the operating facility of the generator. Of course, the designs of the rotor and stator may be reversed.

When the fins 11 move back, away from the stopper 7, the separation between the first and second triboelectric materials increases. This induces another electrical signal that has an opposite polarity compared to the impact signal. With subsequent rotational oscillations the triboelectric energy generator 1 produces an alternating electrical signal.

The protrusions are wedge shaped and complement the shape of the fins 11 of the rotor 5, such that the area of overlap between the first triboelectric material 9 and the second triboelectric material 13 is maximized.

Both of the lateral surfaces of the stopper 7 and the fins 11 of the rotor are provided with triboelectric material. Therefore, when one side of the fin 11 contacts a surface of the stopper 7 provided with the second triboelectric material 13 the other side of the fin 11 is at maximum separation from the corresponding stopper surface.

The device forms a complete circle, which is divided into sectors by the stoppers. The example shown has six rotor fins 11, each with a range of movement of around 35 degrees. The stoppers thus extend to around 25 degrees, so that each stopper and spacing between stoppers is 60 degrees, There may be more or less fins disposed around the full circle. The angular freedom of the rotor may be increased or decreased, by changing the number of stopper elements and fins.

The stopper may be arranged such that when the oscillating second generating element strikes the stopper a voltage is produced, which can be used as a trigger signal for synchronization, for example for synchronizing power conversion. In this way, power conversion may be performed more efficiently.

Figure 2:
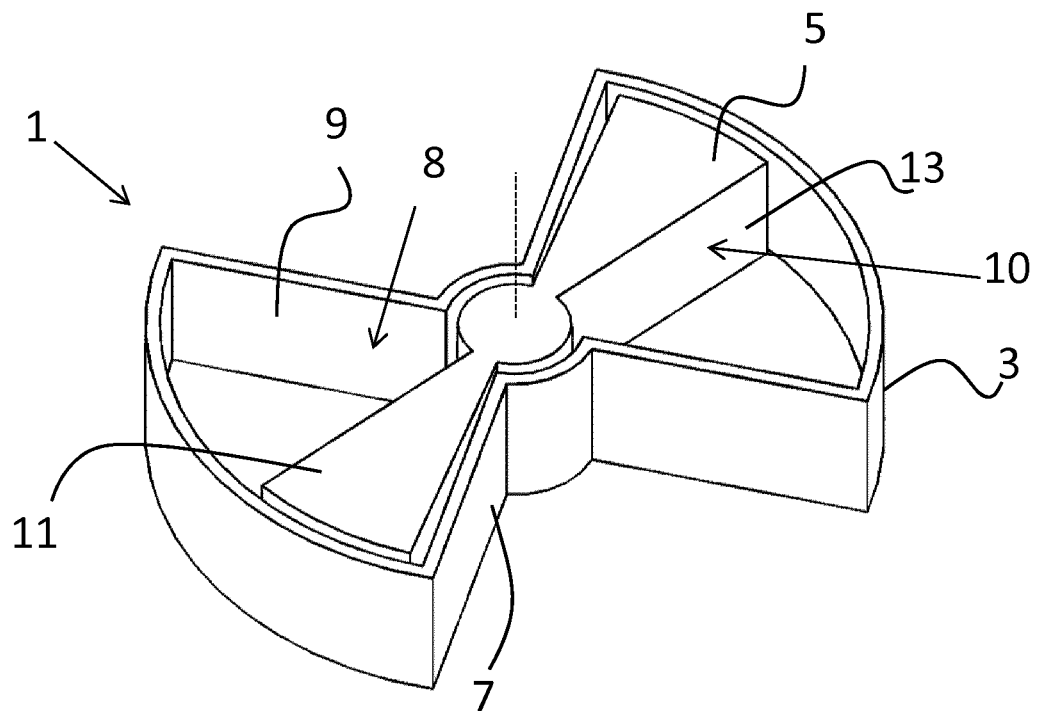
FIG. 2 shows a triboelectric energy generator according to a second example.

FIG. 2 shows another example of a triboelectric energy generator 1, which again comprises a stator 3 and a rotor 5, which are arranged co-axially. The rotor 5 is provided inside the stator 3, and the outer wall of the stator provides a stopper 7. A section of the outer wall provided with the first triboelectric material 9 implements the first generating element 8. The stator 3 comprises a first electrode positioned below or behind the first triboelectric material 9. The rotor 5 comprises two fins 11, which implement the second generating element 10. The fins 11 rotate about the co-axis (shown by the dashed line) between a first configuration in which a first pair of fin surfaces provided with the second triboelectric material 13 contact an outer wall of the stator 3 provided with the first triboelectric material 9 and a second configuration in which a second pair of fin surfaces provided with a second triboelectric material 13 contact a portion of the outer wall provided with a first triboelectric material 13. The rotor 5 comprises a second electrode positioned below or behind the second triboelectric material 13.

This design has an overall bow tie shape, and there are only two diametrically opposite fins 11, each housed within a chamber. The fin may occupy an angle of just less than half of the angular extent of the cavity formed by the stopper 7.

Figure 3:
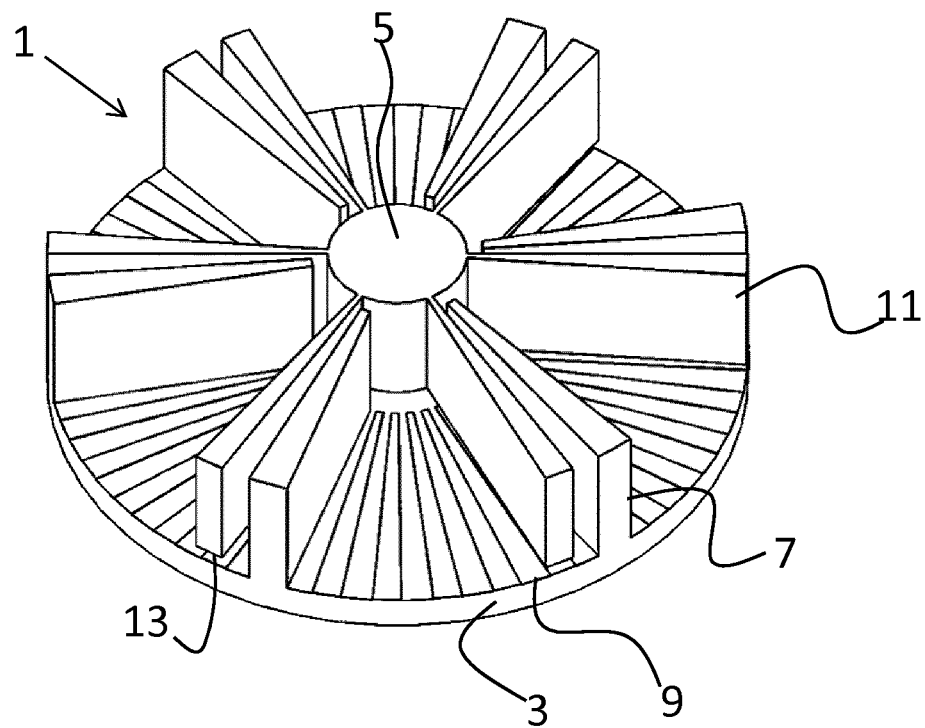
FIG. 3 shows a triboelectric energy generator according to a third example.

FIG. 3 shows a rotationally oscillating triboelectric energy generator 1 in which one or more segments of the first triboelectric material 9 are provided on the base of the stator 3, underneath the rotor 5. The stator 3 comprises a first electrode positioned below or behind the first triboelectric material 9. The rotor 5 comprises a plurality of fins 11. The second triboelectric material 13 is provided on a lower surface of the fins, which faces the base of the stator 3. Wedge shaped stoppers 7 protrude upwardly from the base of the stator 3 and extend from a peripheral edge of the stator surface towards the centre of the stator 3. As the rotor 5 rotates between the stoppers 7, the lower surface of the fins 11 provided with the second triboelectric material 13 and the segments of the first triboelectric material 9 provided on the base of the stator 3 are brought in and out of overlap. The rotor 5 comprises a second electrode positioned below or behind the second triboelectric material 13. As each consecutively spaced sector of the rotor comes into and then out of overlap with a given stator sector, so a current is induced between the two sector plates, initially in a first direction, as the plates increase in overlap, and then in the opposite direction as the plates decrease in overlap.

The rotor 5 can either be arranged to make physical contact with the first triboelectric material 9, or it can be separated from the base of the stator by an air gap. In this example, the triboelectric energy generator 1 generates an alternating electrical signal that is dependent on the oscillation frequency of the rotor and the number of triboelectric segments on the base of the stator 3, between the consecutive parts of the stopper 7.

There may be only one stator electrode for each stator chamber (between a pair of stoppers 7). The stator electrode may then occupy just under half of the angular area so that the rotor moves between fully overlapping the stator electrode and not overlapping at all. Alternatively, there may be a set of spaced stator electrodes in each chamber, as shown. FIG. 3 shows five stator electrodes in each chamber. In all cases, the stator electrodes may correspond in size and shape to the rotor fin electrode.

Figure 4:
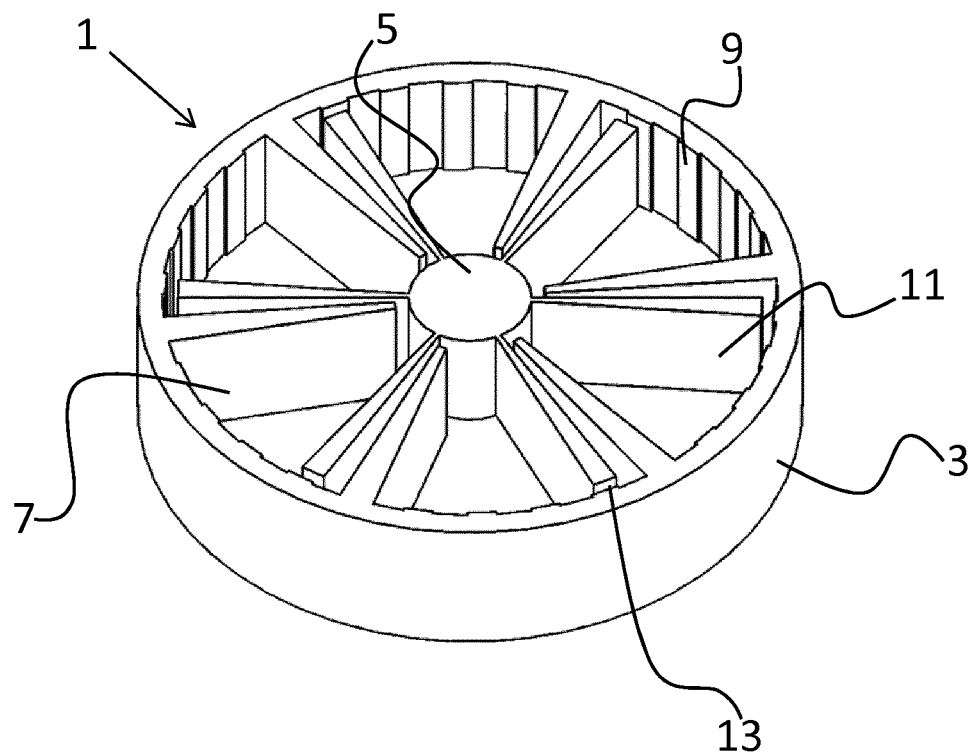
FIG. 4 shows a triboelectric energy generator according to a fourth example.

FIG. 4 shows a rotationally oscillating triboelectric energy generator 1 with an outside enclosure wall which extends around the periphery of the stator 3. Segments of the first triboelectric material 9 are placed on an inside surface of the outer wall which faces the centre of the stator 3. The rotor 5 comprises a plurality of fins 11, the radially outside tips of which are covered with the second triboelectric material 13. The rotor 5 may either be arranged to contact the stator, to slide along the segments of the first triboelectric material 9 or, in an alternative example, it may be arranged to be separated from the segments by an air gap. The triboelectric energy generator 1 will generate an alternating electrical signal depending on the frequency of the oscillation and the number of triboelectric segments between consecutive parts of the stopper 7.

Figure 5:
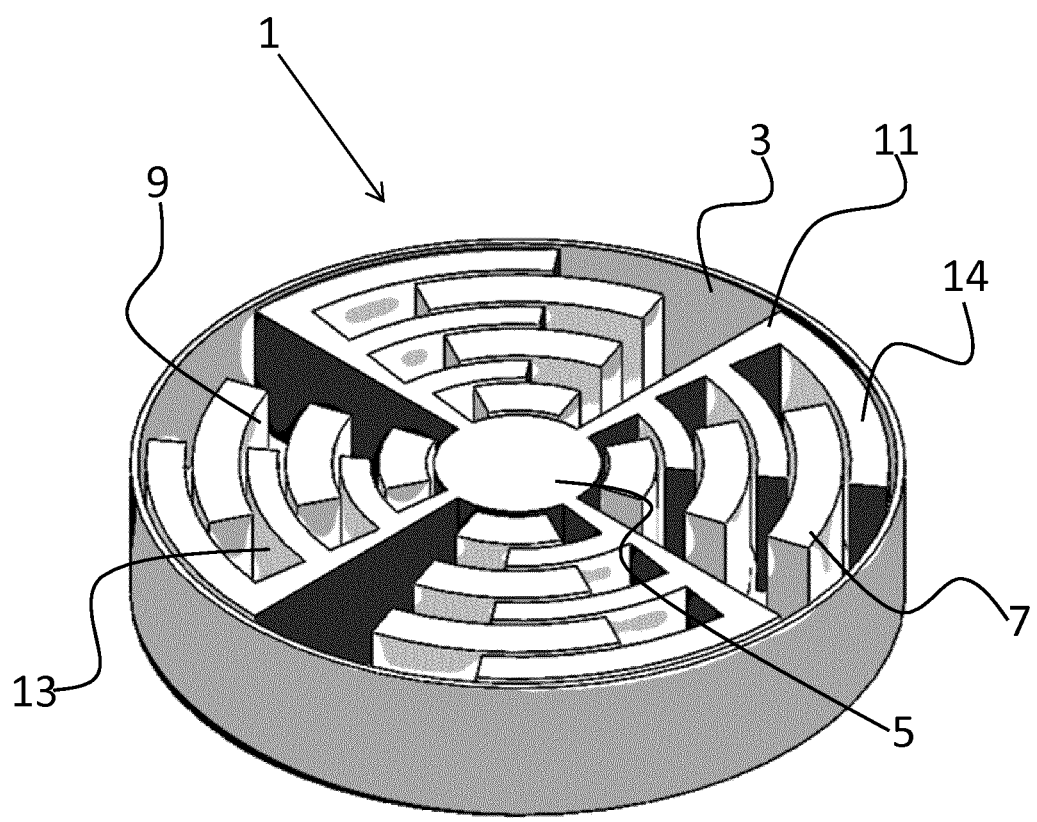
FIG. 5 shows a triboelectric energy generator according to a fifth example.

FIG. 5 shows a triboelectric energy generator 1 again comprising a rotor 5 and stator 3. In this example, the rotor 5 and the stator 3 are adapted to fit together at a particular angle of rotation. The rotor 5 comprises a plurality of fins 11 which extend radially from the centre of the rotor. The fins 11 comprise arcuate interlocking members 14 that are shaped to interlock with the stator 3. Thus, the rotor may be considered to have a set of radial trunks 11 from which a set of circumferential branches 14 extend. The stator 3 comprises a plurality of concentric protrusions which provide a stopper 7 by butting against the radial fins 11. In examples, the branches protrude from both sides of the fins 11. The protrusions are shaped to complement the shape of the interlocking members 14, so that the stopper 7 and the interlocking members 14 connect with each other when they are brought together. Surfaces of the protrusions which implement the stopper 7 are provided with the first triboelectric material 9 and outer surfaces of the interlocking members are provided with the second triboelectric material 13. The stator 3 comprises a first electrode positioned below or behind the first triboelectric material 9, and the rotor 5 comprises a second electrode positioned below or behind the second triboelectric material 13. The materials are provided on the curved surfaces. When the rotor and stator are interlocked, a set of concentric contact areas is defined. The range of angular movement of the rotor is for example sufficient to fully interlock the rotor and stator and to fully release the rotor from the stator.

In use, when rotor 5 is rotated in a first direction, the surfaces of the fins comprising the second triboelectric material and surfaces of the stopper protrusions which implement the first triboelectric material are brought together, so that the area of overlap is increased. When the rotor 5 is rotated in a second direction, opposite to the first direction, the fins and the stopper protrusions moved away from each other so that the area of overlap between the first and second triboelectric materials decreases. By providing this arrangement, a greater effective triboelectric surface area between the rotor and stator is enabled. The rotor 5 can either be arranged to physically contact the stator, and slide along the triboelectric segments, or it can be separated from the segments by an air gap.

By rotating the rotor in alternate directions, an alternating electrical signal is generated, which depends on the frequency of the oscillation frequency. The output power of the generator will depend on the oscillating frequency and the number of pairs of protrusions and locking members 14 provided with the first and second triboelectric material respectively.

Each rotor chamber may have two or more arcuate parts 14. Three are shown in FIG. 5, but there may be more to increase the area of overlap. For example, there may be between 2 and 10 arcuate concentric portions, and a corresponding number of arcuate stator portions 7 which function as the stoppers. The rotor branches may be flexible; the branches may be constructed from a flexible material or may have a thin structure, for example the branches may comprise a thin foil, to enable the branches to be flexible.

Note that the circular overall designs of FIGS. 3, 4 and 5 may be modified to provide a pair of opposing chambers only, in the manner of FIG. 2. This provides a different form factor which may be beneficial for some designs.

The examples above are based on rotation between the rotor and stator about a fixed axis. This is not the only option.

Figure 6A:
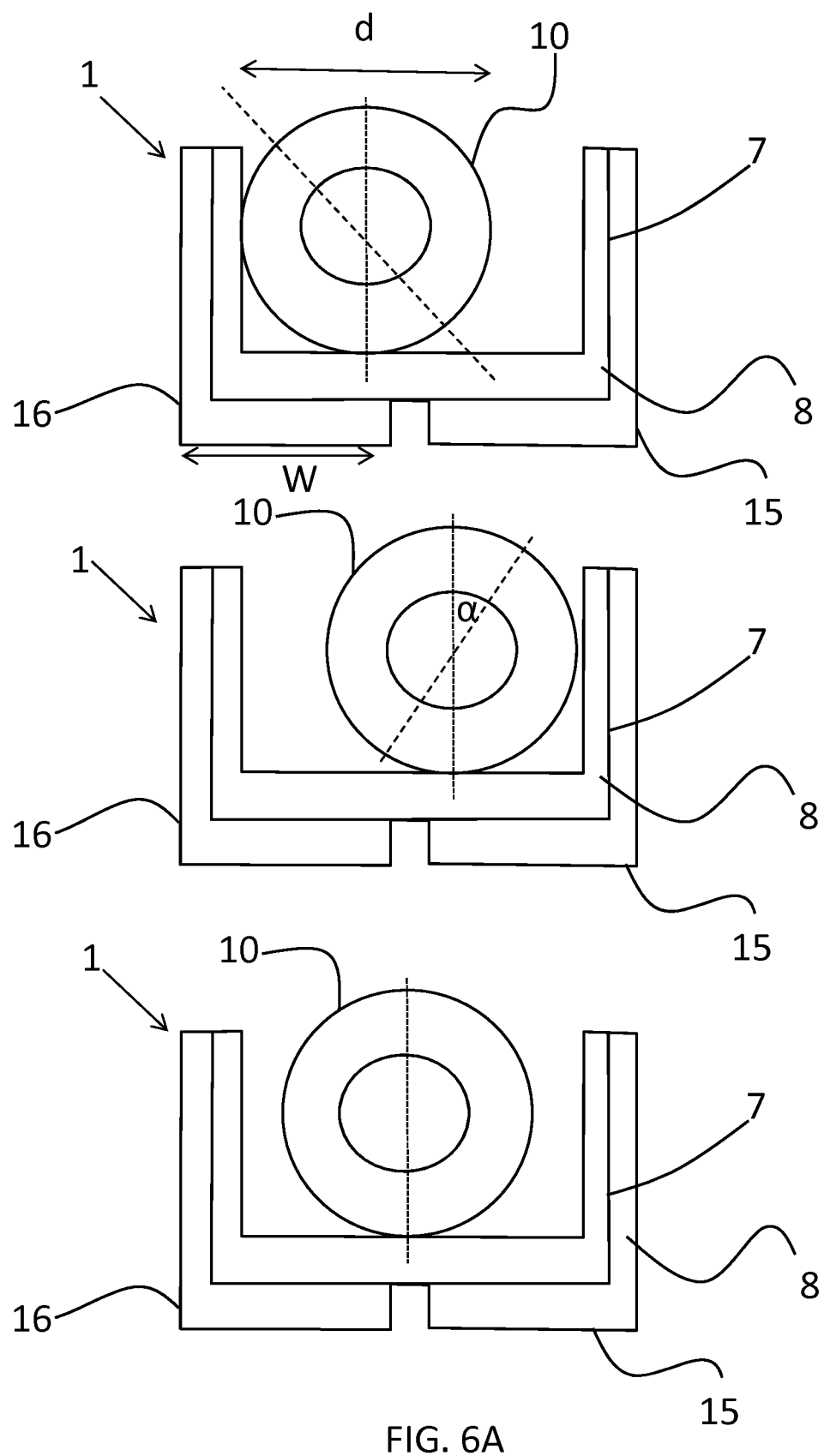
FIG. 6A shows a triboelectric energy generator according to a sixth example.

FIG. 6A shows another example of a triboelectric energy generator 1 according to an example. The triboelectric energy generator 1 comprises a first generating element 8 which comprises a base portion and two lateral walls which are provided on opposite sides of a central axis, and a second generating element 10 which comprises a circular body of the second triboelectric material. The first generating element comprises the first triboelectric material. The lateral walls of the first generating element 8 provide a stopper 7 which restricts movement of the second generating element 10 so that it may only rotate by a desired angle, which is less than, for example, 60 degrees.

The rotation is about a moving axis, since the rotation is accompanied by translation, in that the second generating element 10 (which may be considered to be the rotor) performs a rolling action. The angular range of the rotation depends on the radius of the second generating element and the width of the electrode. This arrangement may be used for rotational movements of less than 45 degrees for example. In some embodiments, the diameter of the second generating element (d) may be equal to the width of the electrode (W). In other embodiments, the diameter of the second generating element is within the range $W \leq d \geq 1.5\,W$.

In particular, the second generating element 10 is arranged to roll between the lateral walls of the first generating element 8. The second generating element preferably comprises a conductive material to facilitate an equal distribution of charge on the surface. In a first configuration, a first portion of the second triboelectric material contacts a first wall of the first generating element 8 (top diagram). In a second configuration, a second portion of the second triboelectric material contacts a second wall of the first generating element (lower diagram). The second triboelectric element oscillates between the first and second configurations. In an equilibrium configuration (middle diagram), only one part of the second generating element contacts the first generating element whereas in the second configuration two sections of the second generating element contact the first generating element.

A first electrode 15 is provided on a first side of the first generating element 8 and a second electrode 16 is provided on a second side of the first generating element 8, opposite to the first side.

One of the electrodes could be used also to synchronize the power generation system. Switched capacitor converters can for example be implemented as power converters. Although such converters do not require any inductance, their driving signals still need to be correctly synchronized with the signal generated by the TEGs. In this case, the generator may be used with a switched capacitor converter for down-converting the output voltage of the power generator. The switched capacitor converter comprises a bank of capacitors and a switch arrangement. A controller is used to control the switches, based on a feedback signal from the power generator. In this way, the power generator creates a feedback signal which is then used to control a switched capacitor converter for converting the input voltage, for example for down-converting the input voltage, without significant power losses. The feedback signal is generated in directly in response to motion. This means the feedback signal is not generated based on signal processing of the output voltage or power, and therefore does not require significant power consumption to generate the feedback signal. This provides automatic control of the switched capacitor converter, thereby simplifying the overall control circuitry and improving efficiency. Self-synchronization may be used for other applications than power conversion, for example self-synchronization controlling power output. Since the output signal of the TEG control electrode has a frequency proportional to the rotational speed of the rotor, this information can be used as a feedback signal to a controller arranged to control the rotational speed of the oscillating charge generation element, and thus the output power of the TEG.

Figure 6B:
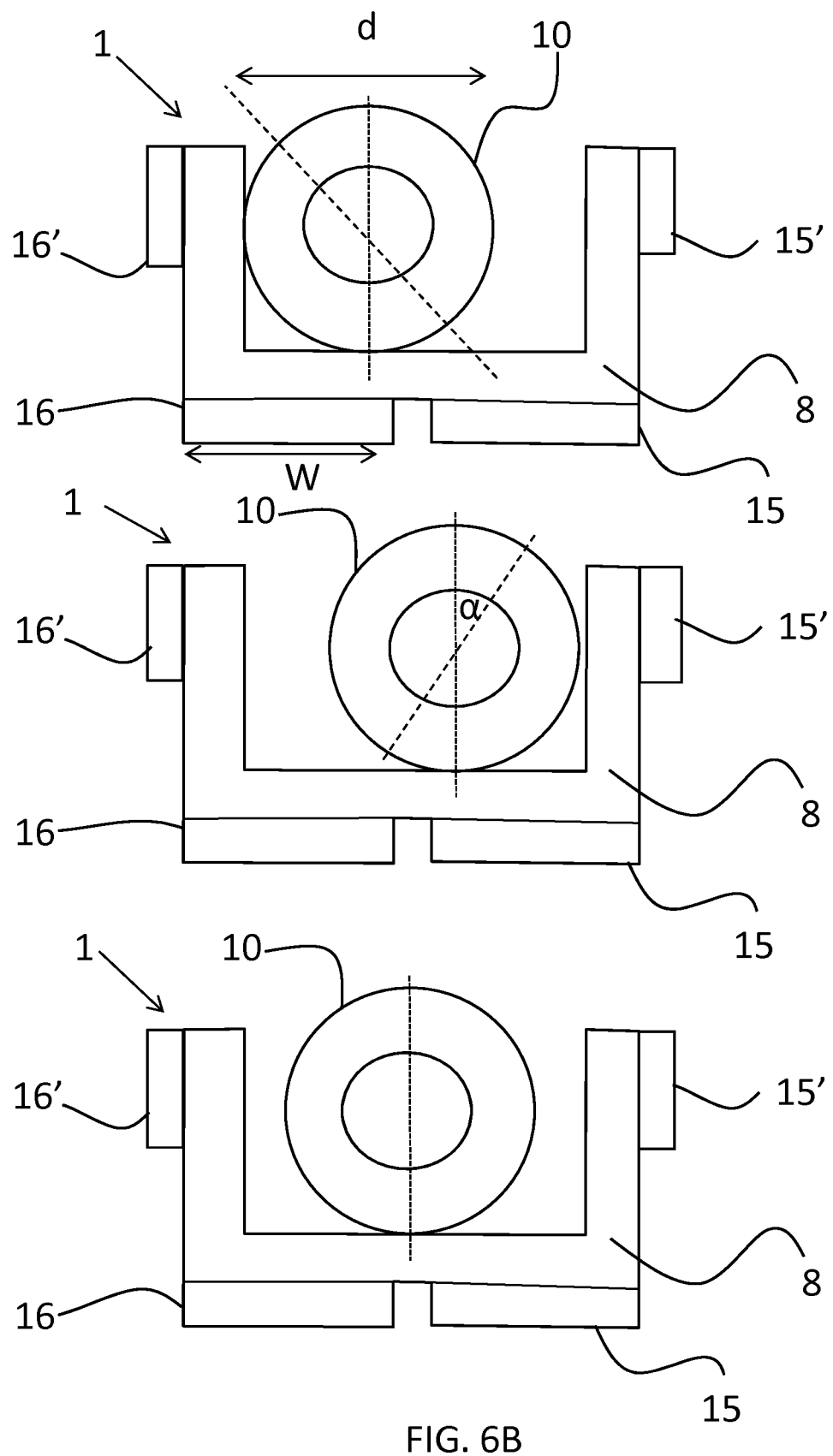
FIG. 6B shows a triboelectric energy generator according to a seventh example.

FIG. 6B shows an arrangement in which an additional control electrode 15', 16' is provided at each side to facilitate synchronization of the power generation system. The synchronization electrodes are designed so that the switching pattern for the switched capacitor converter is synchronized with the output voltage of the TEG. This means there is automatic generation of a synchronized control signal, based on optimal positioning of the control electrodes with respect to the power generation electrodes. In this way, the power conversion can be optimized without the need of a special detection and control circuit.

Figure 7:
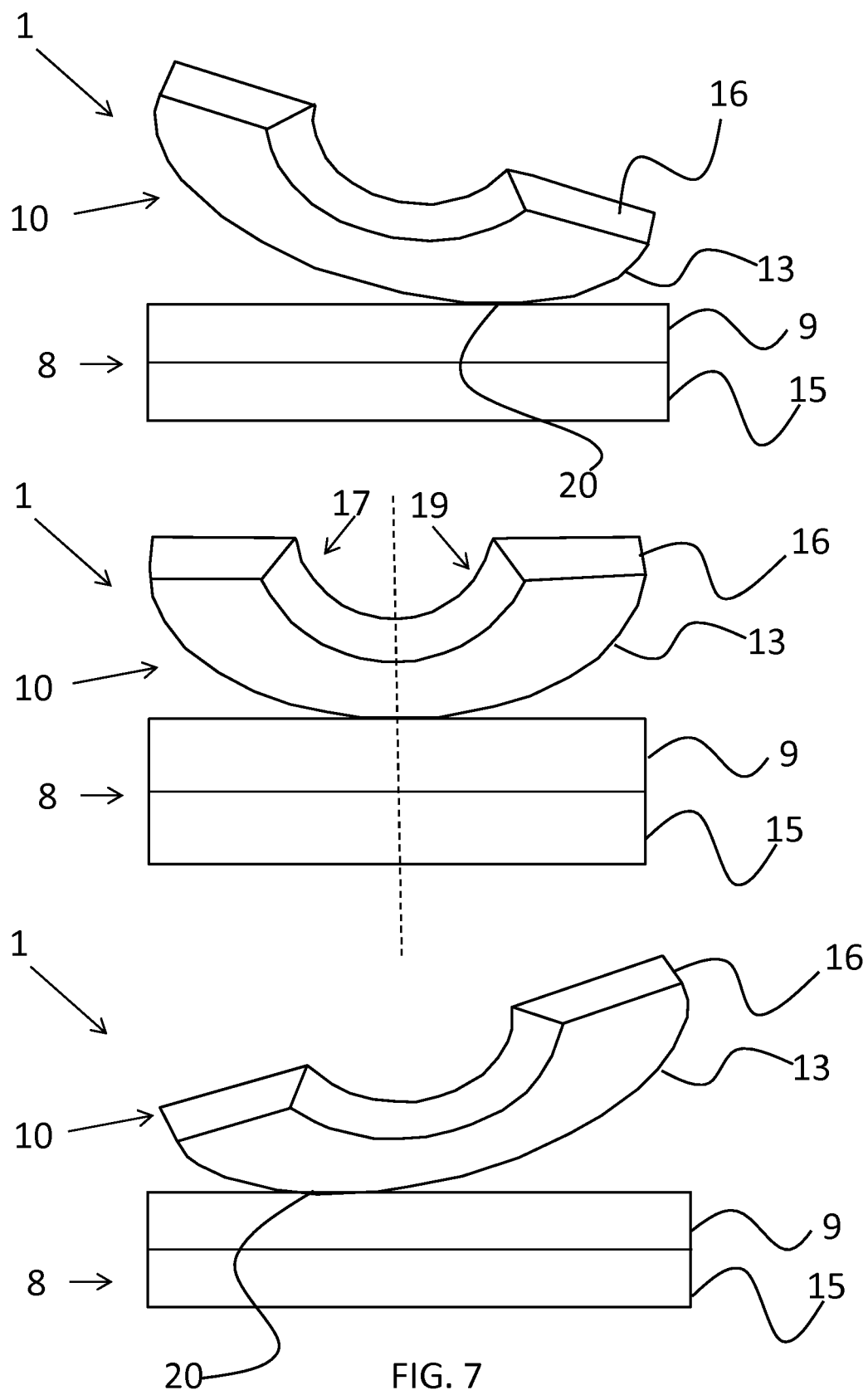
FIG. 7 shows a triboelectric energy generator according to an eighth example.

FIG. 7 shows an example of a triboelectric energy generator 1 which is designed to provide an output voltage from small rocking movements, for example for movements having a rocking angle α, wherein sin(α)=α. For example, the rocking movements may have a rocking angle of equal to or less than 15 degrees. The triboelectric energy generator 1 comprises a first generating element 8 comprising a first triboelectric material 9 and a first electrode 15, and a second generating element 10 comprising a second triboelectric material 13 and a second electrode 16. The second generating element 10 is adapted to oscillate about a central axis in a rocking motion; it comprises a first portion 17 and a second portion 19 which are disposed on opposing sides of an axis through the centre of the second generating element in the equilibrium position (middle diagram). An outer surface of each of the portions is arranged to contact the first triboelectric material at the extremes of the oscillation, and defines a charging surface 20. The second generating element 13 is arranged to oscillate about the central axis from a first position (upper diagram) through an equilibrium position (middle diagram) to a second position (lower diagram). In the first position, the first portion contacts the first generating element.

In use, the triboelectric energy generator performs a rocking motion, such that in the extreme positions of the oscillation one of the first and the second portions is in contact with the first generating element 8. When the first portion contacts the first generating element 8, the second triboelectric material 13 provided on the first portion contacts the first triboelectric material 9. While the second portion contacts the first generating element 8, the second triboelectric material 13 provided on the second portion contact the first triboelectric material 9. While one of the first and second portions is moving towards the first generating element, the other of the first and second portions is moving away. The generator is designed such that while one portion of the second generating element is being charged via electrification, a potential difference is built up between the other portion of the second generating element and the first generating element. This is an open circuit voltage, which increases as capacitance decreases according to:

$$C=\varepsilon A/d$$

i.e. $V=Q/C=\sigma d/\varepsilon$ wherein C is capacitance, ε is the dielectric constant, σ is surface charge density, V is voltage, Q is charge, A is the contact area between the first generating element and the first or second portion of the second generating element, and d is the vertical separation distance between the first generating element and the first or second portion of the second generating element.

Since only a relatively small portion of the first and second generating elements 8, 10 constantly contact each other, device durability and life time may be improved.

The central figure shows the triboelectric energy generator 1 in the equilibrium position. The first and second generating elements may be designed such that the portion of the generating element that contacts the other of the first and second generating elements in the equilibrium position is not provided with triboelectric material, such that in the equilibrium position the second triboelectric material does not contact the first triboelectric material.

The lower figure shows the triboelectric energy generator in the second position. The second portion of the second generating element 10 contacts the first triboelectric material 9 of the first generating element 8.

Figure 8:
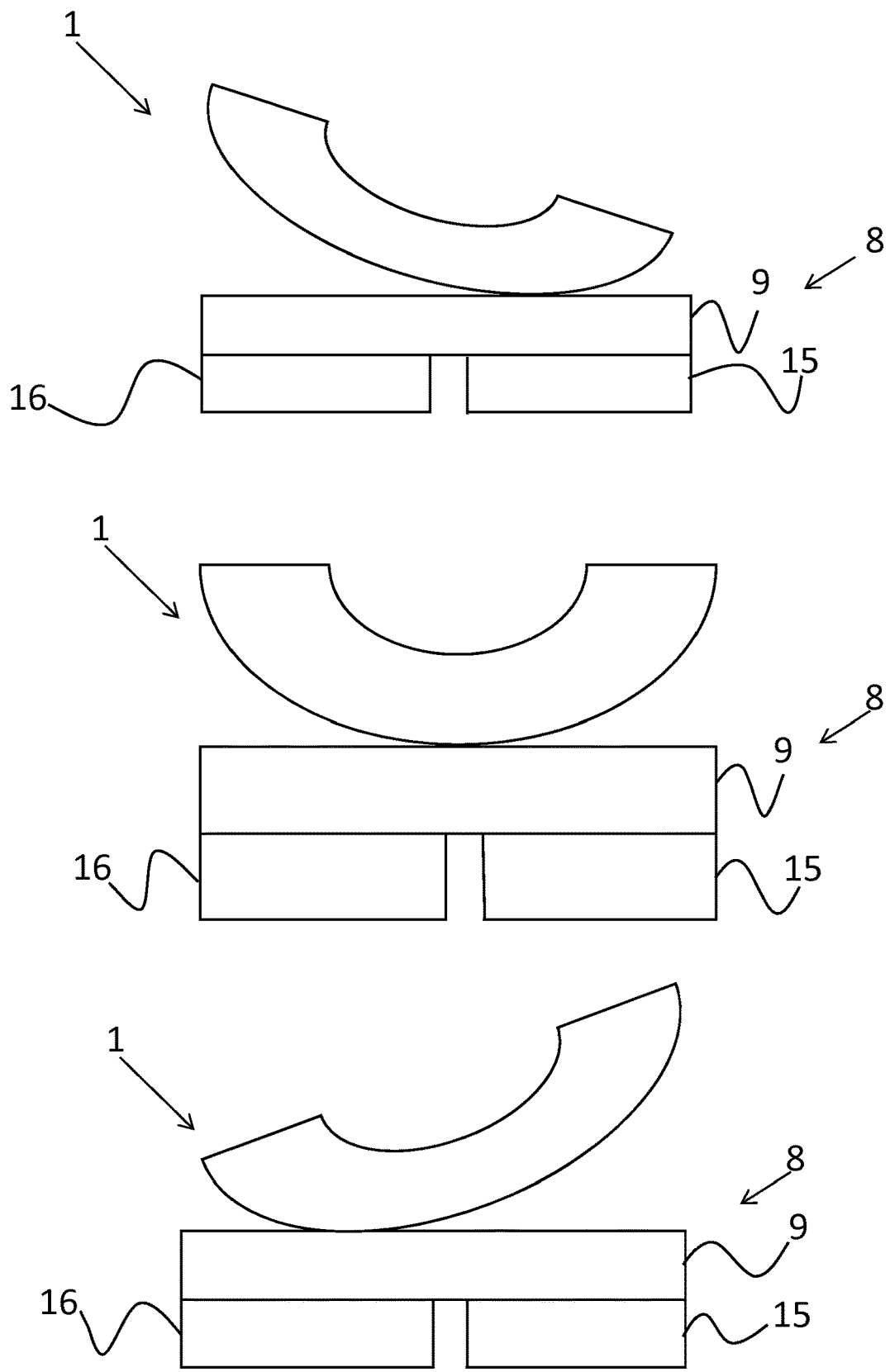
FIG. 8 shows a triboelectric energy generator according to a ninth example.

FIG. 8 shows a triboelectric energy generator 1 designed to operate in a similar way to the device of FIG. 7, i.e. in a "rocking mode". However, in this example the first generating element 8 comprises the two electrodes 15, 16 which are disposed on the same side of the first triboelectric material 9.

Figure 9:
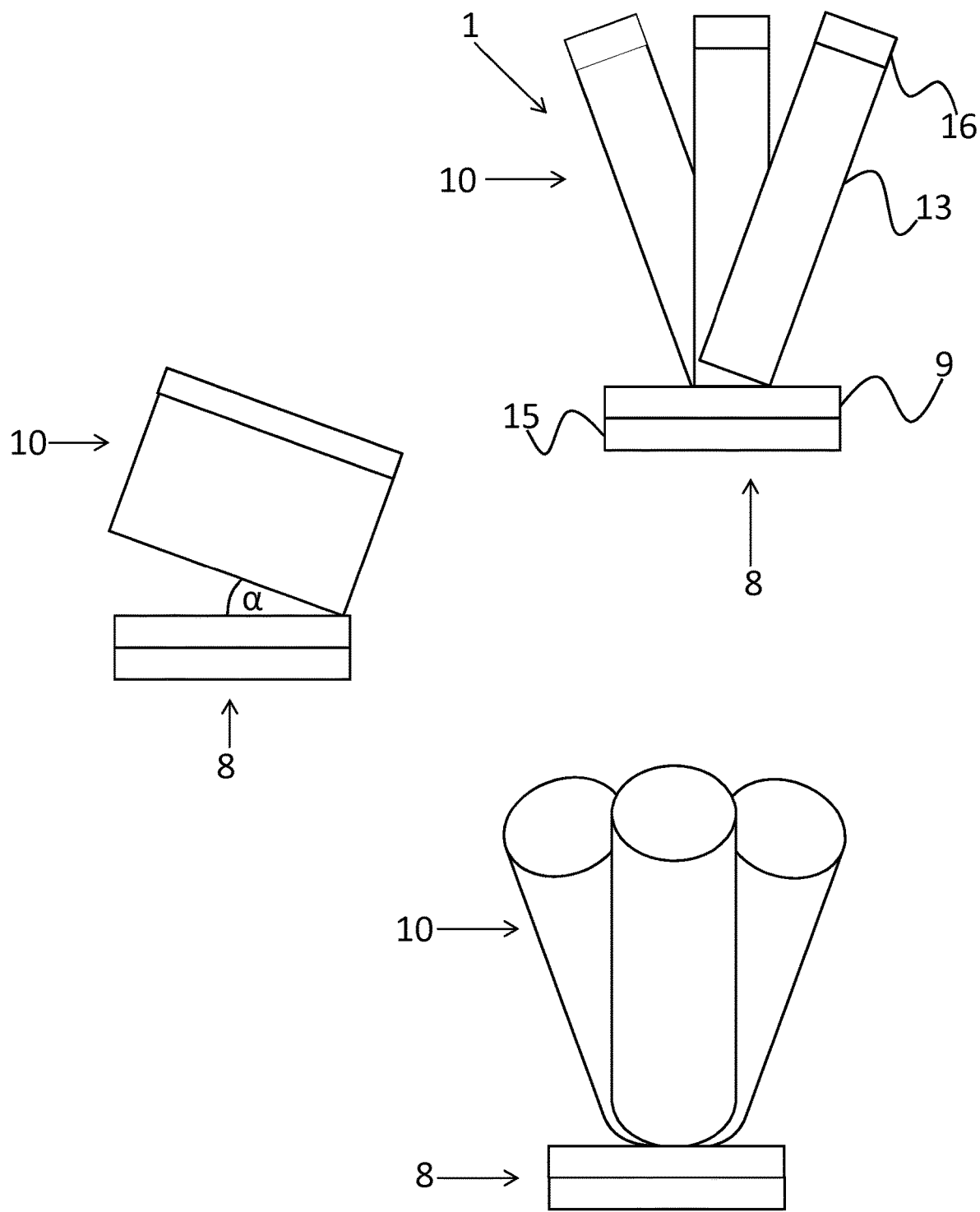
FIG. 9 shows a triboelectric energy generator according to a tenth example.

FIG. 9 shows a triboelectric energy generator 1 adapted to oscillate with a tilting motion. Again, the triboelectric energy generator may be particularly optimized for tilting angles (α) meeting the requirement that sin(α)=α. The upper figure illustrates the tilting motion of the triboelectric energy generator, the middle figure shows the arrangement of the first and second generating elements 8, 10 and the lower figure show a front view of the triboelectric energy generator 1.

As shown in the upper figure, the first generating element 8 comprises a first triboelectric material 9 provided on a first electrode 15 and the second generating element 10 comprises a second triboelectric material 13 provided on a second electrode 16. The second generating element 10 is arranged to oscillate or swing with respect to the first generating element 8. Movement of the second generating element 10 relative to the first generating element 8 causes a potential difference to build up between the generating elements.

As shown in the middle figure, the first generating element 8 is arranged to tilt up to a maximum angle (α) with respect to a second generating element 10. In the example, the tilting angle is preferably less than 10 degrees.

As shown in the lower figure, the second generating element 10 also rotates about an axis perpendicular to the first generating element, which may increase product lifetime and durability.

FIGS. 6 through 10 can thus be summarized in that the triboelectric energy generator comprises:
a first generating element; and
a second generating element, having a central axis, comprising:
a first portion on a first side of the central axis; and
a second portion on a second side of the central axis opposite to the first side, wherein the second generating element is arranged to oscillate about the central axis from a first position, at which the first portion contacts the first generating element, to a second position at which the second portion contacts the first generating element.

As a variation the first portion and the second portion comprises a charging surface (20) arranged to contact the first triboelectric material in use.

Also the second generating element can be adapted such that in use the angle subtended by the charging surface of the portion in contact with the first triboelectric material is equal to or less than 180 degrees, and preferably equal to or less than 90 degrees.

The second generating element can be configured to rotate about a central axis.

The first generating element can comprise a first electrode and the second generating element can comprise a second electrode or the first generating element comprises a first electrode and a second electrode.

A stopper can be used, wherein the second generating element contacts the stopper in the first position and the second position, wherein the angle of rotation of the second generating element between the first and second positions is for example less than 45 degrees.

For all examples, various driving schemes to control the small motions may be used. In examples, the TEG may be controlled to periodically alternate between a contact-mode, during which elements of the generator are brought into contact to induce a state of charging, and a non-contact mode, during which plates of the generator are separated from one another and electrical energy is generated through electrostatic induction. Timing and duration of contact and non-contact modes may be controlled by a controller, or by user commands, in dependence on a charge state of the elements of the generator. In this way elements are controlled to come into contact only when surface charge has fallen below a certain level, and re-charging is necessary. The contact time between the elements may hence be minimized—thereby minimizing incurred noise and surface wear—whilst still maintaining a given desired threshold power output.

It will be understood that while self-synchronized power generation is described with reference to the example illustrated by FIG. 6B, it may be used with any of the above described examples.

It will be understood that all of the examples above are design for small reciprocating movements, and with small amplitude, for example, rotating, rolling, tilting or swinging oscillating movements with small amplitude and preferably small frequencies.

In examples, for example FIGS. 1 to 5, the angular spacing between the electrodes may be equal to or smaller than the rotational angle. In this manner, the power output is increased as a complete overlap/non-overlap between rotor and stator electrodes is achieved.

In examples, the first and second generating elements typically include or are attached to an electrode to enable charge to be captured.

The stator may not be circular. Instead, the stator may be any other shape, including square, oval etc.

Referring to FIGS. 6A and 6B, the second generating element may comprise a cylinder. The cylinder may be solid or hollow.

The first and second generating element may be of the second triboelectric material or may be coated with the second triboelectric material.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

Any reference signs in the claims should not be construed as limiting the scope.

The invention claimed is:

1. A triboelectric energy generator adapted to generate electrical energy from rotational oscillatory motion, comprising:
a first generating element comprising a first triboelectric material;
a second generating element comprising a second triboelectric material;
a stator comprising the first generating element;
a rotor comprising the second generating element; and
a stopper;
wherein the second generating element is arranged to oscillate about a rotation axis with respect to the first generating element to generate an output voltage;
wherein the rotor and the stator are co-axial and the rotor is arranged to rotate about a co-axis; and
wherein the stopper is arranged to limit the rotation of the rotor about the co-axis.

2. The triboelectric energy generator of claim 1, wherein the rotor comprises a plurality of fins that project outwardly from the co-axis, and wherein the stopper is arranged to restrict movement of the fins.

3. The triboelectric energy generator of claim 2, wherein the first generating element comprises at least one fin of the plurality of fins, and the second generating element is arranged to interface with the first generating element.

4. The triboelectric energy generator of claim 1, wherein the stopper is configured to restrict the rotor to rotate within an angular range less than 360 degrees.

5. The triboelectric energy generator of claim 1, wherein the stator comprises the stopper.

6. The triboelectric energy generator of claim 5, wherein a surface of the stopper arranged to contact the second generating element is provided with the first triboelectric material.

7. The triboelectric energy generator of claim 1, wherein the rotor comprises an interlocking member, and the stopper is shaped to receive the interlocking member.

8. The triboelectric energy generator of claim 1, wherein the first generating element comprises a first electrode attached to the first triboelectric material and the second generating element comprises a second electrode attached to the second triboelectric material.

9. The triboelectric energy generator of claim 1, wherein the stopper is configured to restrict the rotor to rotate within an angular range less than 90 degrees.

10. The triboelectric energy generator of claim 1, wherein the stopper is configured to restrict the rotor to rotate within an angular range less than 30 degrees.

11. The triboelectric energy generator of claim 1, wherein the first generating element is disposed in one or more segments on a surface of the stator, and the second generating element is disposed on one or more surfaces of the rotor opposite the surface of the stator.

12. The triboelectric energy generator of claim 1, wherein the first generating element is disposed in one or more segments on a perimeter of the stator, and the second generating element is disposed on one or more surfaces of the rotor opposite the segments on the perimeter of the stator.

13. A triboelectric energy generator adapted to generate electrical energy from rotational oscillatory motion, comprising:
   a first generating element comprising a first triboelectric material;
   a second generating element comprising a second triboelectric material;
   a stator comprising the first generating element;
   a rotor comprising the second generating element; and
   a stopper;
   wherein the second generating element is arranged to oscillate about a rotation axis with respect to the first generating element to generate an output voltage;
   wherein the rotor and the stator are co-axial and the rotor is arranged to rotate about a co-axis;
   wherein the stopper is arranged to limit the rotation of the rotor about the co-axis; and
   wherein the rotor comprises a set of radial trunks from which a set of circumferential branches extend, and the stator comprises a plurality of circumferential protrusions that interlock with circumferential branches.

14. The triboelectric energy generator of claim 13, wherein the stopper comprises one or more of the radial trunks.

15. The triboelectric energy generator of claim 13, wherein each set of circumferential branches extend from opposite surfaces of the corresponding radial trunk.

16. The triboelectric energy generator of claim 13, wherein the circumferential branches are flexible.

17. The triboelectric energy generator of claim 1,
   wherein the stator comprises a plurality of protrusions that extend from a periphery of the stator toward the co-axis,
   wherein the plurality of protrusions provide a plurality of spaces within the periphery, and
   wherein the rotor comprises a plurality of fins that traverse the plurality of spaces as the rotor rotates about the stator.

18. The triboelectric energy generator of claim 1, wherein the stopper comprises one or more of the protrusions.

19. The triboelectric energy generator of claim 13, wherein the stopper is configured to restrict the rotor to rotate within an angular range less than 90 degrees.

20. The triboelectric energy generator of claim 13, wherein the stopper is configured to restrict the rotor to rotate within an angular range less than 30 degrees.

* * * * *